(12) United States Patent
Yamada et al.

(10) Patent No.: US 8,523,284 B2
(45) Date of Patent: Sep. 3, 2013

(54) SEAT FRAME

(75) Inventors: Yukifumi Yamada, Toyota (JP); Naoki Goto, Tokai (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 119 days.

(21) Appl. No.: 13/306,346

(22) Filed: Nov. 29, 2011

(65) Prior Publication Data

US 2012/0139315 A1 Jun. 7, 2012

(30) Foreign Application Priority Data

Dec. 1, 2010 (JP) ................................ 2010-268215

(51) Int. Cl.
*B60N 2/42* (2006.01)

(52) U.S. Cl.
USPC ............... 297/452.18; 297/452.2; 297/216.13

(58) Field of Classification Search
USPC ............................. 297/216.13, 452.18, 452.2
See application file for complete search history.

(56) References Cited

U.S. PATENT DOCUMENTS

| | | | | |
|---|---|---|---|---|
| 5,193,881 | A * | 3/1993 | Minai ....................... | 297/452.18 |
| 5,918,943 | A * | 7/1999 | Mitschelen et al. ..... | 297/452.18 |
| 6,375,267 | B1 * | 4/2002 | Ishikawa .................. | 297/452.18 |
| 6,398,300 | B1 * | 6/2002 | Young ...................... | 297/216.13 |
| 6,499,806 | B2 * | 12/2002 | Nagayasu et al. ......... | 297/452.2 |
| 6,513,878 | B2 * | 2/2003 | Nagayasu et al. ....... | 297/452.18 |
| 6,585,325 | B1 | 7/2003 | Pal | |
| 6,817,672 | B2 * | 11/2004 | Matsunuma ............. | 297/452.18 |
| 6,869,145 | B2 * | 3/2005 | Matsunuma ............. | 297/452.18 |
| 7,093,901 | B2 * | 8/2006 | Yamada .................. | 297/452.2 X |
| 7,284,800 | B2 * | 10/2007 | Ishizuka .................. | 297/452.18 |
| 7,469,967 | B1 * | 12/2008 | Hori et al. ................ | 297/452.18 |
| 7,497,521 | B2 * | 3/2009 | Whalen et al. ....... | 297/452.18 X |
| 7,731,292 | B2 * | 6/2010 | Ishijima et al. .......... | 297/452.18 |
| 7,794,023 | B2 * | 9/2010 | Whalen et al. ....... | 297/452.18 X |
| 7,887,139 | B2 * | 2/2011 | Yamada et al. .......... | 297/452.18 |
| 8,132,862 | B2 * | 3/2012 | Yamada et al. ........... | 297/452.2 |
| 8,267,479 | B2 * | 9/2012 | Yamada et al. .......... | 297/452.18 |

(Continued)

FOREIGN PATENT DOCUMENTS

JP 2002-59770 2/2002

OTHER PUBLICATIONS

European Search Report issued Jan. 26, 2012 in patent application No. EP 11 19 1458.

*Primary Examiner* — Rodney B White
(74) *Attorney, Agent, or Firm* — Oblon, Spivak, McClelland, Maier & Neustadt, L.L.P.

(57) ABSTRACT

A seat frame includes a projecting portion formed on a surface of a recliner to face a reinforcement plate, the projecting portion having a cross sectional shape with a recessed portion and a protruded portion in a rotational direction of the recliner, the reinforcement plate including a first through-hole for fitting the projecting portion, the upward-downward direction frame including a second through-hole larger than the first through-hole which extends within the second through-hole when the upward-downward direction frame and the reinforcement plate are overlaid, and a three-member welding portion formed by a periphery of the projecting portion, a periphery of the first through-hole, and a periphery of the second through-hole wherein the recliner, the reinforcement plate, and the upward-downward direction frame are welded with the projecting portion of the recliner fitting to the first through-hole of the reinforcement plate while the reinforcement plate and the upward-downward direction frame are overlaid.

5 Claims, 9 Drawing Sheets

(56) References Cited

U.S. PATENT DOCUMENTS

| | | |
|---|---|---|
| 2010/0187886 A1 | 7/2010 | Yamada et al. |
| 2010/0187893 A1 | 7/2010 | Yamada et al. |
| 2011/0278892 A1* | 11/2011 | Kroener et al. ...... 297/452.18 X |
| 2012/0217775 A1* | 8/2012 | Fujita et al. ............... 297/216.13 |
| 2012/0306253 A1* | 12/2012 | Seibold et al. ........ 297/452.18 X |

* cited by examiner

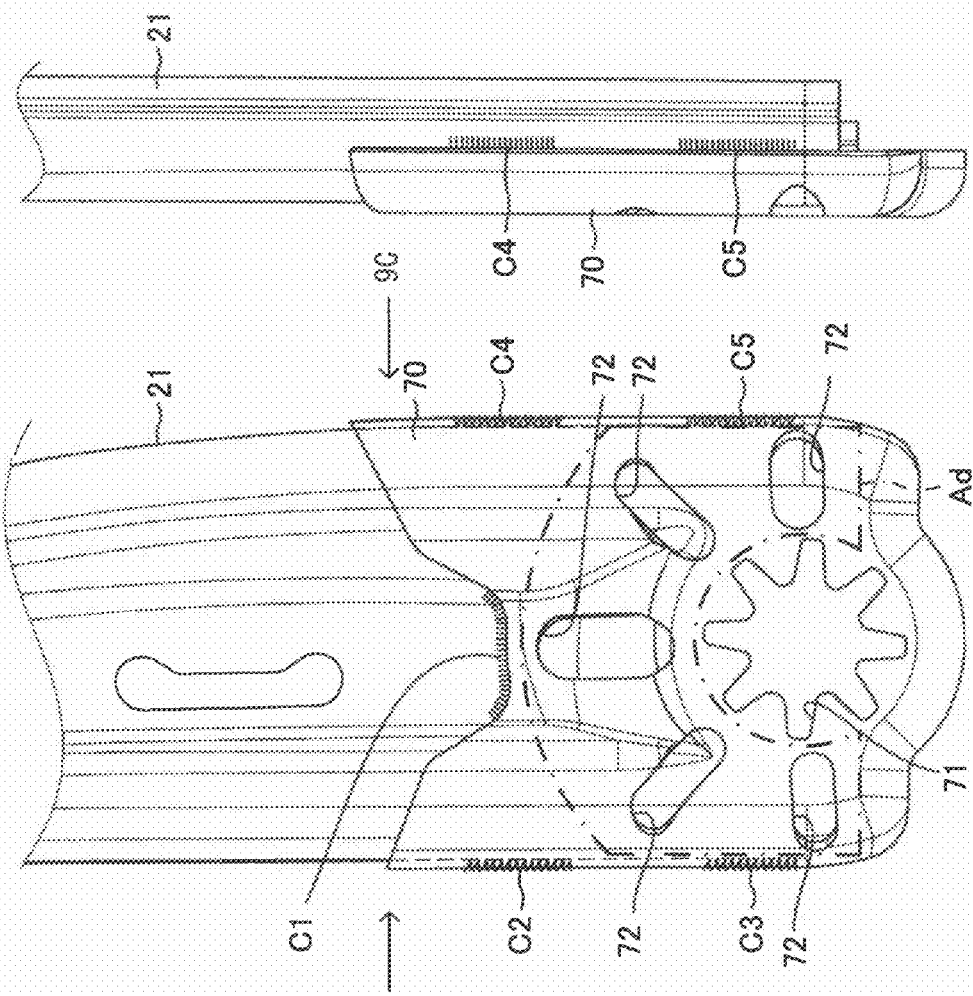

SEAT FRAME

CROSS REFERENCE TO RELATED APPLICATIONS

This application is based on and claims priority under 35 U.S.C. §119 to Japanese Patent Application 2010-268215, filed on Dec. 1, 2010, the entire content of which is incorporated herein by references.

TECHNICAL FIELD

This disclosure generally relates to a seat frame for a vehicle.

BACKGROUND DISCUSSION

A seat frame having a seat cushion frame supporting a vehicle seat and a seatback frame supporting a seatback of the vehicle seat, connected to the seat cushion frame and equipped with a retractor (a seat belt retaining member), is known. The seat cushion frame includes a front-rear direction frame extending along a front-rear direction of a seat cushion. The seatback frame includes an upward-downward direction frame extending along an upward-downward direction of a seatback.

A seat frame with a recliner connected to a rear end portion of a main side cushion side frame (the front-rear direction frame) and the lower end portion of a main side back side frame (the upward-downward direction frame) is disclosed in JP2002-59770A. According to the seat frame disclosed in JP2002-59770A, the recliner includes a lower arm and an upper arm each in a flat plate form. The lower arm is connected to the main side cushion side frame. The upper arm is connected to the main side back side frame. The main side cushion side frame and the main side back side frame both have closed cross sectional structures. The lower arm is inserted into the main side cushion side frame from the upper opening, biased to a side wall of the main side cushion side frame by collars, and fastened by bolts to be retained in the biased state. The upper arm is inserted into the main side back side frame from the lower opening, biased to a side wall of the main side back side frame by collars, and fastened by bolts to be retained in the biased state.

According to the seat frame disclosed in JP2002-59770A, a side frame with closed cross sectional structure and the recliner are fastened by bolts. In this construction, when a tensile force is applied from a seat belt to the main side back side frame, rigidity of the side frame in cross section changes significantly depending on a direction of the applied tensile force. Also in this construction, a possibility for a buckling distortion to occur is high because the stress by the tensile force from the seat belt concentrates on the bolted portions.

A need thus exists for a seat frame, which is not susceptible to the drawback mentioned above.

SUMMARY

In light of the foregoing, the disclosure provides a seat frame which includes a seat cushion frame including a front-rear direction frame extending along a front-rear direction of a seat cushion of a vehicle seat and supporting the seat cushion, a seatback frame with a retractor installed to retain one end of a seat belt, including an upward-downward direction frame extending along an upward-downward direction of a seatback of a vehicle and supporting the seatback, a recliner arranged between a rear end portion of the front-rear direction frame and a lower end portion of the upward-downward direction frame, the recliner being adapted to rotate for adjusting an inclination angle of the seatback relative to the seat cushion, a reinforcement plate placed between the upward-downward direction frame and the recliner, the reinforcement plate being joined with the upward-downward direction frame in lap-joint fashion for reinforcing the strength of the upward-downward direction frame against the tensile force from the seat belt, a projecting portion formed on a surface of the recliner to face the reinforcement plate, the projection portion having a cross sectional shape with a recessed portion and a protruded portion in a rotational direction of the recliner. The reinforcement plate includes a first through-hole for fitting the projecting portion. The upward-downward direction frame includes a second through-hole larger than the first through-hole that extends within the second through-hole when the upward-downward direction frame and the reinforcement plate are overlaid. A three-member welding portion is formed by a projecting portion periphery of the projecting portion, a first through-hole periphery of the first through-hole, and a second through-hole periphery of the second through-hole wherein the recliner, the reinforcement plate and the upward-downward direction frame are welded together in a state which the projecting portion of the recliner fits into the first through-hole of the reinforcement plate while the reinforcement plate and the upward-downward direction frame are overlaid.

BRIEF DESCRIPTION OF THE DRAWINGS

The foregoing and additional features and characteristics of this disclosure will become more apparent from the following detailed description considered with the reference to the accompanying drawings, wherein:

FIG. 9A is a drawing illustrating the connection between the right seatback side member and the reinforcement plate in two-member welding portions illustrated in FIG. 9B viewed from the arrow 9A;

FIG. 9B is a drawing illustrating the connection between the right seatback side member and the reinforcement plate in two-member welding portions; and FIG. 9C is a drawing illustrating the connection between the right seatback side member and the reinforcement plate in two-member welding portions illustrated in FIG. 9B viewed from the arrow 9C.

DETAILED DESCRIPTION

Figure 1:
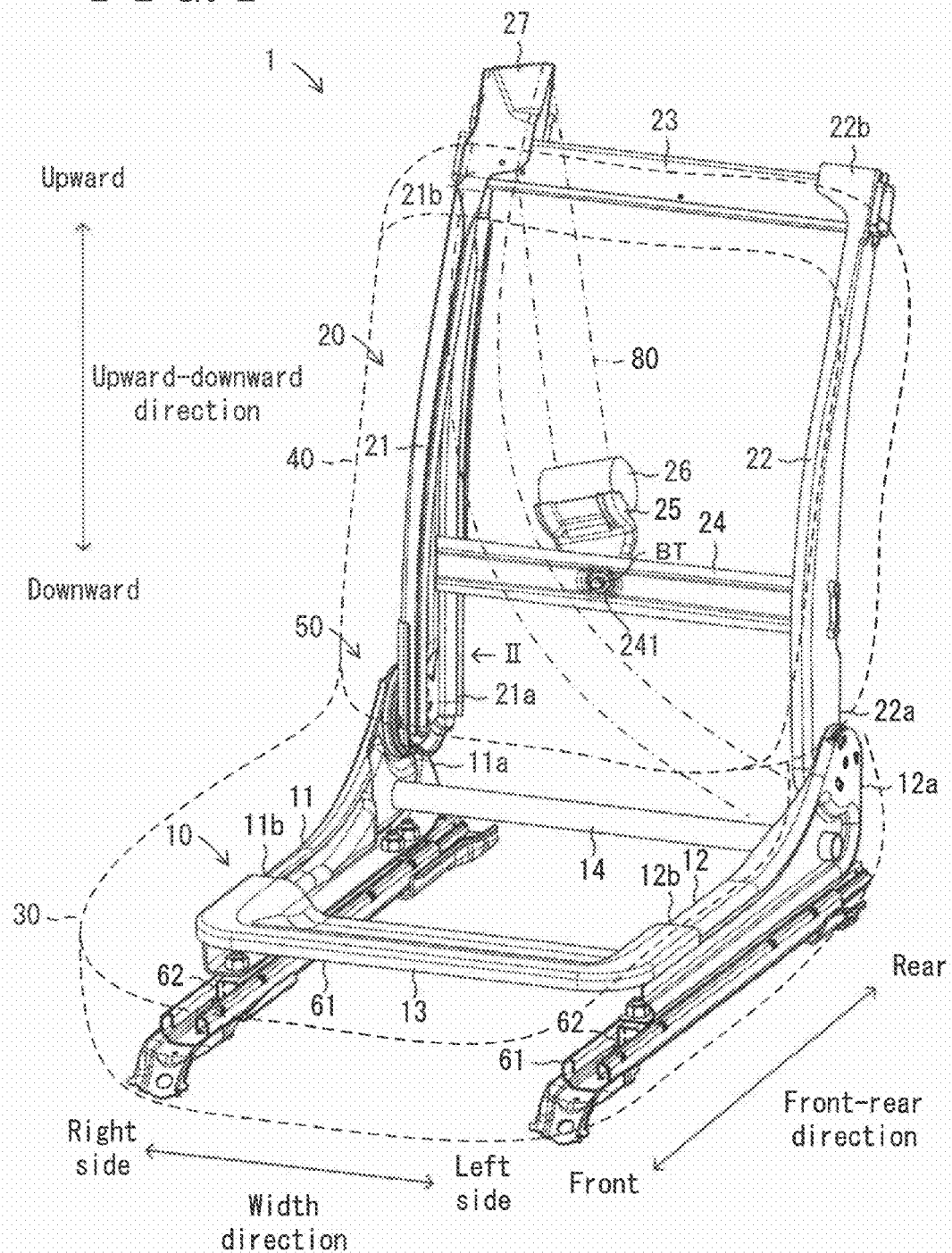
FIG. 1 is a perspective view of a seat frame according to an embodiment disclosed here.

An embodiment of a seat frame 1 will be described as follows. FIG. 1 is a perspective view of a seat frame according to an embodiment disclosed here. As FIG. 1 illustrates, the seat frame 1 according to the embodiment includes a seat cushion frame 10, a seatback frame 20, and a recliner 50. The seat cushion frame 10 supports a seat cushion 30, which is a sitting portion of a vehicle seat. The seatback frame 20 supports a seatback 40, which is a backrest portion of a vehicle seat.

The seat cushion frame 10 includes a right seat-cushion side member 11, a left seat-cushion side member 12, a front cross member 13 and a rear cross member 14. The right seat-cushion side member 11 is placed in a right side lower portion of the seat cushion 30. The left seat-cushion side member 12 is placed in a left side lower portion of the seat cushion 30. The right and left sides in this disclosure are defined as directions viewed from an occupant sitting in a vehicle seat.

The right seat-cushion side member 11 extends along a front-rear direction of the seat cushion 30 of a vehicle and connects to the recliner 50 at a rearward portion 11a of the right seat-cushion side member 11. The right seat-cushion side member 11 serves as the front-rear direction frame and the rearward portion 11a serves as the rear end portion in this disclosure. The left seat-cushion side member 12 extends along the front-rear direction of the seat cushion 30 of the vehicle and connects to a left seatback side member 22, which will be described later, at a rearward portion 12a of the left seat-cushion side member 12. The front cross member 13 connects a frontward portion 11b of the right seat-cushion side member 11 and a frontward portion 12b of the left seat-cushion side member 12. The rear cross member 14 connects the rearward portion 11a of the right seat-cushion side member 11 and the rearward portion 12a of the left seat-cushion side member 12. In each lower surface of the right seat-cushion side member 11 and the left seat-cushion side member 12, a seat rail 61 which extends along the front-rear direction of the vehicle and rail guide members 62 that fit into the respective seat rail 61 are connected. A position of the seat frame 1 in front-rear direction is adjusted by moving the rail guide members 62 along the respective seat rails 61.

The seatback frame 20 includes a right seatback side member 21, the left seatback side member 22, and an upper cross member 23. The right seatback side member 21 supports a right side portion of the seatback 40. The left seatback side member 22 supports a left side portion of the seatback 40. The right seatback side member 21 and the left seatback side member 22 extend along an upward-downward direction of the seatback 40. The right seatback side member 21 connects to the recliner 50 at a lower portion 21a of the right seatback side member 21. The right seatback side member 21 serves as an upward-downward direction frame and the lower portion 21a servers as a lower end portion in this disclosure. The left seatback side member 22 connects to the rearward portion 12a of the left seat-cushion side member 12 at a lower portion 22a of the left seatback side member 22. The upper cross member 23 extends in a width direction and connects an upper portion 21b of the right seatback side member 21 and an upper portion 22b of the left seatback side member 22. A lower cross member 24 extends in the width direction and connects the right seatback side member 21 and the left seatback side member 22 at their middle portions in the upward-downward direction.

A bolt insertion hole 241 is formed near a middle portion in the width direction of the lower cross member 24. A bolt BT or a similar fastening member is inserted through the bolt insertion hole 241. A bracket 25 is retained to the lower cross member 24 by the bolt BT or the similar fastening member and a nut or similar member that screws on to the bolt BT or the similar fastening member. At the tip of the bracket 25, a retractor 26 is attached. In other words, the retractor 26 is attached to the lower cross member 24 (to the seatback frame 20) via the bracket 25. The retractor 26 retains an end of a seat belt 80. The retractor 26 may be arranged so that the seat belt 80 is reeled in when a predetermined amount of tensile force is generated by the seat belt 80.

A seat belt guide 27 is attached to an upper end of the right seatback side member 21. The seat belt 80 having one end retained by the retractor 26 laps over the seat belt guide 27. An anchor plate arranged in a lower portion of the right seatback side member 21 retains another end of the seat belt 80. A tongue plate is attached along the seat belt 80 in a middle way in a movable manner. A buckle is arranged in a lower portion of the left seatback side member 22 so that the tongue plate is retained. When the buckle retains the tongue plate, the seat belt 80 at a position between the seat belt guide 27 and the tongue plate restrains an upper body of the occupant. At the same time, the seat belt 80 restrains the waist portion of the occupant at a position between the tongue plate and the anchor plate. Further description of a seat belt structure is omitted because the structure similar to this disclosure is widely known.

Figure 2:
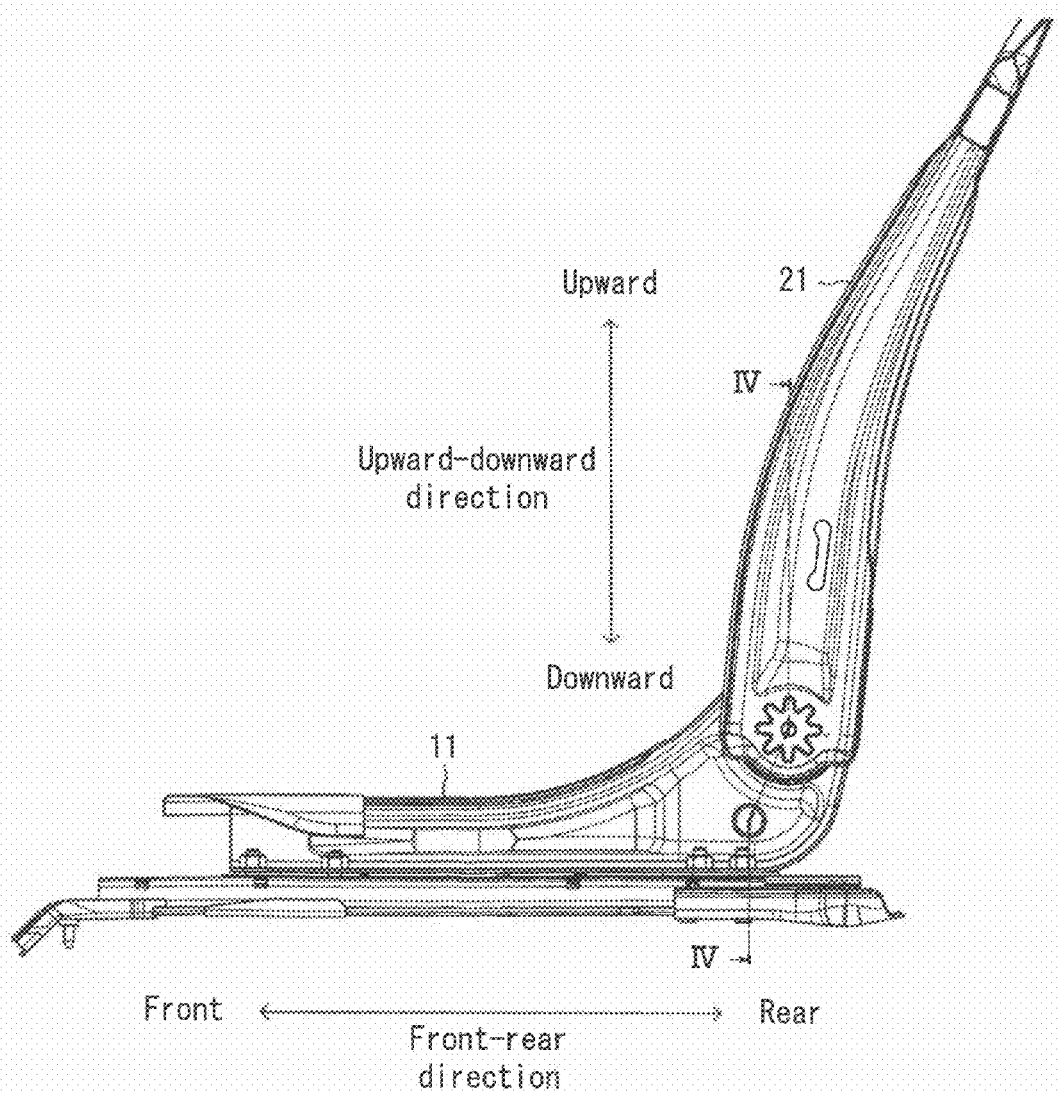
FIG. 2 is the seat frame illustrated in FIG. 1 viewed from the arrow II.

FIG. 2 shows the seat frame illustrated in FIG. 1 viewed from the arrow II. As illustrated in FIG. 2 the right seatback side member 21 curves in a rear direction as the member extends upward in the upward-downward direction.

Figure 3:
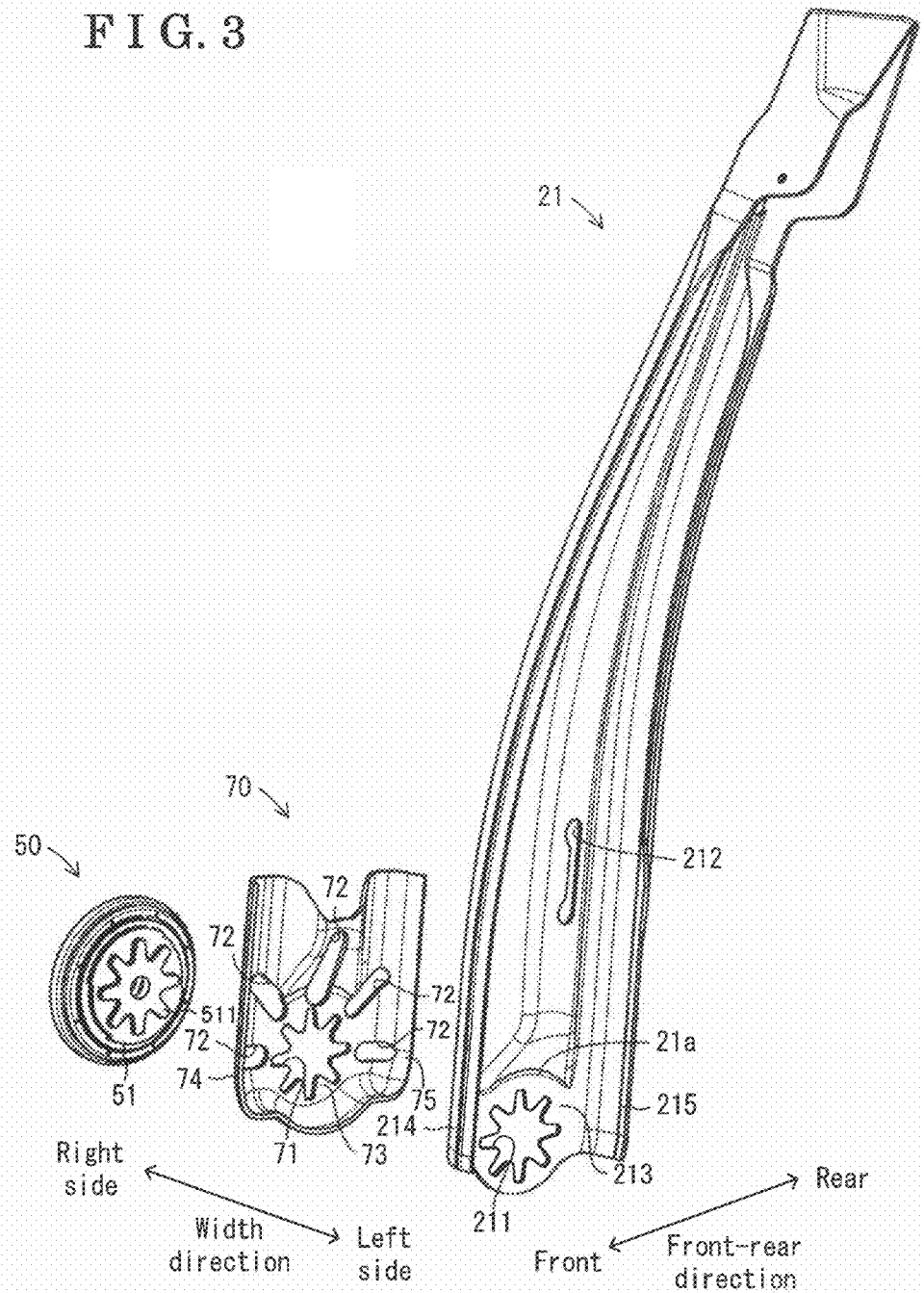
FIG. 3 is an exploded perspective view that illustrates a connecting structure between a right seatback side member and a recliner.

FIG. 3 is an exploded perspective view that illustrates a connecting structure between a right seatback side member 21 and a recliner 50. As FIG. 3 illustrates, a reinforcement plate 70 is placed between the right seatback side member 21 and the recliner 50. When the reinforcement plate 70 is joined with the right seatback side member 21 in lap-joint fashion, a strength of the right seatback side member 21 is reinforced.

Figure 4:
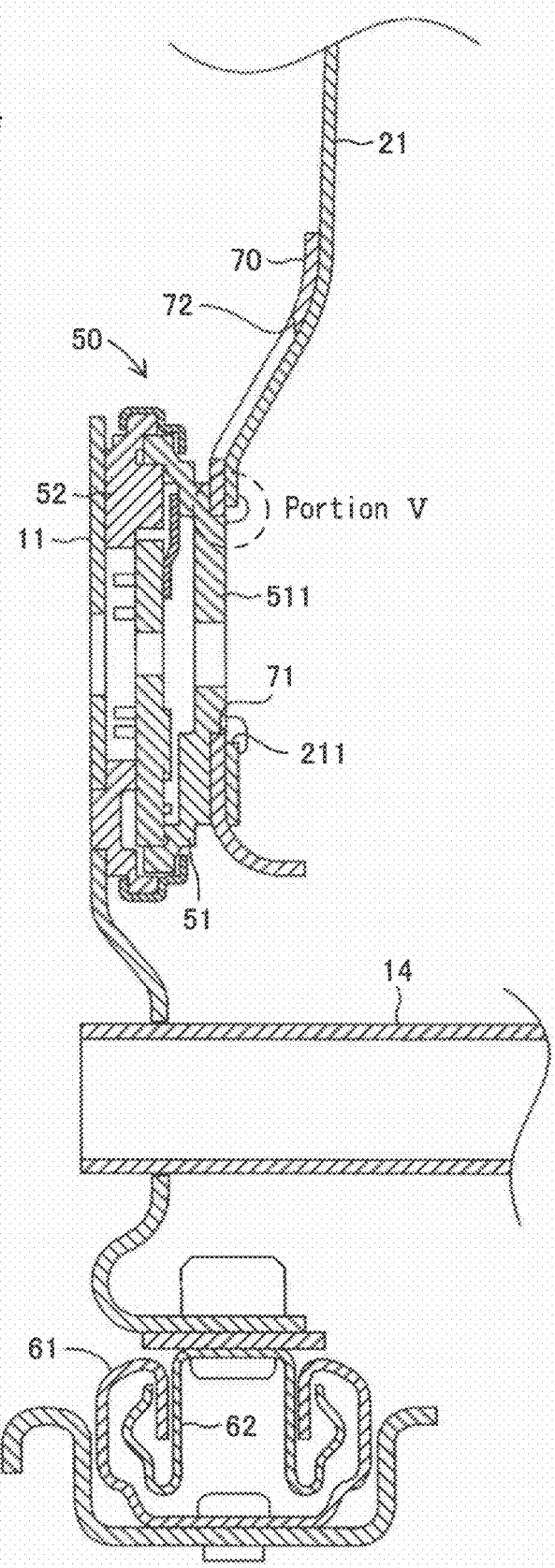
FIG. 4 is a cross-sectional view of the seat frame taken along a line IV-IV in FIG. 2.

FIG. 4 is a cross-sectional view of the seat frame taken along a line IV-IV in FIG. 2. As FIG. 4 illustrates, the recliner 50 in the embodiment disclosed here is a round type recliner with a first circular plate portion 51 and a second circular plate portion 52. The first circular plate portion 51 connects to the reinforcement plate 70 and to the right seatback side member 21. The second circular plate portion 52 connects to the right seat-cushion side member 11. The first circular plate portion 51 and the second circular plate portion 52 are assembled so that the first circular plate portion 51 may rotate relative to the second circular plate portion 52. By rotating the first circular plate portion 51 relative to the second circular plate portion 52, the inclination angle of the seat cushion 30 relative to the seatback 40 is adjusted. The recliner 50 is configured so that a rotated position of the first circular plate portion 51 relative to the second circular plate portion 52 is retained at a particular position. After the inclination angle of the seatback 40 relative to the seat cushion 30 is adjusted by the occupant by rotating the recliner 50 (by rotating the first circular plate portion 51), the rotated position of the first circular plate portion 51 relative to the second circular plate portion 52 is retained so that the inclination angle of the seat cushion 30 relative to the seatback 40 is retained.

As FIG. 3 and FIG. 4 illustrate, the first circular plate portion 51 of the recliner 50 is formed with a projecting portion 511 on a surface facing the right seatback side member 21. A cross sectional shape of the projecting portion 511 in the embodiment disclosed here is substantially star shaped (referring to FIG. 3). However, the cross sectional shape of the projecting portion 511 is not limited to the shape in the disclosed embodiment. An intricately dented circle, or a circular shape having recessed portions and protruded portions, with the center of the first circular plate portion 51 as the rotating axis may be used as the cross sectional shape of the projecting portion 511. In other words, the cross sectional shape of the projecting portion 511 may be formed with recessed portions and protruded portions in the rotational direction of the recliner 50 (or of the first circular plate portion 51).

As FIG. 3 illustrates, the lower portion 21*a* of the right seatback side member 21 includes a first side wall portion 213 substantially vertical to the width direction of the seatback 40, a first front wall portion 214 extending from the front end of the first side wall portion 213 to the left direction (or an inward direction of the seatback 40), and a first rear wall portion 215 extending from the rear end of the first side wall portion 213 to the left direction (or an inward direction of the seatback 40). The reinforcement plate 70 includes a second side wall portion 73 facing the first side wall portion 213, a second front wall portion 74 facing the first front wall portion 214, and a second rear wall portion 75 facing the second rear wall portion 215. The reinforcement plate 70 is placed over the right seatback side member 21 so that the second side wall portion 73 is placed over the first side wall portion 213 from the right direction (or outward direction of the seatback 40), the second front wall portion 74 is placed over the first front wall portion 214 from the right direction (or outward direction of the seatback 40), and the second rear wall portion 75 is placed over the first rear wall portion 215 from the right direction (or outward direction of the seatback 40).

On the second side wall portion 73 of the reinforcement plate 70, a first through-hole 71 is formed. The first through-hole 71 has the same shape as the cross sectional shape of the projecting portion 511 formed on the recliner 50. The projecting portion 511 of the recliner 50 fits into the first through-hole 71 of the reinforcement plate 70 when the recliner 50 and the reinforcement 70 are assembled.

On the first side wall portion 213 of the right seatback side member 21, a second through-hole 211 is formed. The second through-hole 211 has a shape resembling the cross sectional shape of the projecting portion 511 formed on the recliner 50, but slightly larger than the cross sectional dimension of the projecting portion 511. The first through-hole 71 extends within the second through-hole when the reinforcement plate 70 is placed over the right seatback side member 21. In other words, when the reinforcement plate 70 and the right seatback side member 21 are overlaid, the whole periphery of the first through-hole 71 is visible when viewed from the side of the right seatback side member 21 (through the second through-hole 211). A lower cross member insertion hole 212 is also formed on the right seatback side member 21. Opposite ends of the lower cross member 24 are inserted through the lower cross member insertion hole 212.

On the reinforcement plate 70, multiple deformation through-holes 72 are formed. The deformation through-holes 72 are formed around the first through-hole 71. In the embodiment disclosed here, an area around the first through-hole 71 where the deformation through-holes 72 are formed is referred to as a deformation area Ad (serving as a deformation portion). The deformation area Ad serves the purpose when the area is less rigid compared to the area other than the deformation area Ad. In the embodiment disclosed here, the deformation area Ad is formed to be less rigid by having multiple of the deformation through-holes 72 in the deformation area Ad, however, for lowering rigidity, the deformation area Ad may be formed thinner compared to the area other than the deformation area Ad. Another possibility for lowering rigidity is to form the deformation area Ad in a less rigid material compared to the area other than the deformation area Ad.

Figure 5:
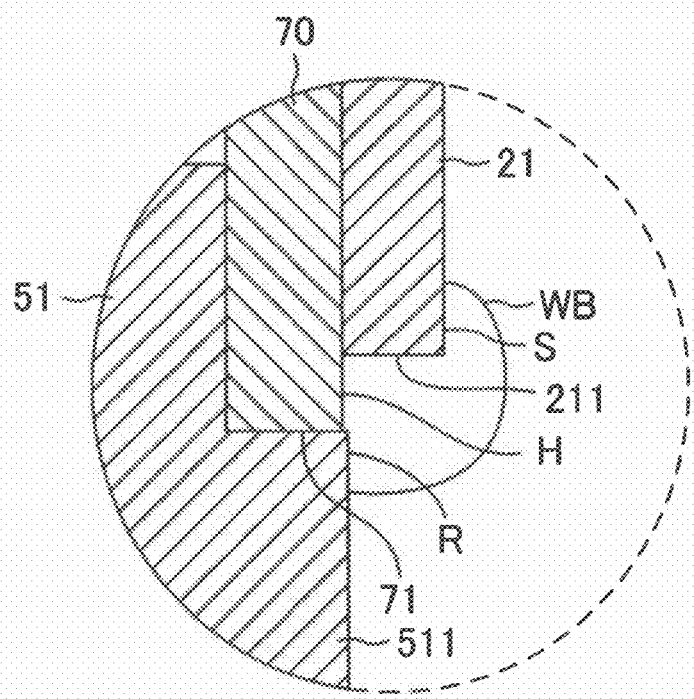
FIG. 5 is an enlarged view of a V portion in FIG. 4.

FIG. 5 is an enlarged view of a portion V in FIG. 4. FIG. 5 illustrates the right seatback side member 21, the reinforcement plate 70, and the first circular plate portion 51 of the recliner 50 in a connected state. As illustrated, the recliner 50 (the first circular plate portion 51), the reinforcement plate 70, and the right seatback side member 21 are welded together at a three-member welding portion D formed by a projecting portion periphery R of the projection portion 511 on the recliner 50, a first through-hole periphery H of the first through-hole 71 on the reinforcement plate 70, and a second through-hole periphery S of the second through-hole 211 on the right seatback side member 21 in a state where the projecting portion 511 of the recliner 50 fits into the first through-hole 71 of the reinforcement plate 70 while the reinforcement plate 70 and the right seatback side member 21 are overlaid in a manner such that the first through-hole 71 extends within the second through-hole 211. WB indicates a welding bead in the drawings. A description of the projecting portion periphery R is inclusive of a periphery outlining the projecting portion 511 at an end surface thereof or a side surface thereof. A description of the first through-hole periphery H is inclusive of a periphery outlining the first through-hole 71 at an opening surface thereof or an inside surface thereof. A description of the second through-hole periphery S is inclusive of a periphery outlining the second through-hole 211 at an opening surface thereof or an inside surface thereof.

Figure 6:
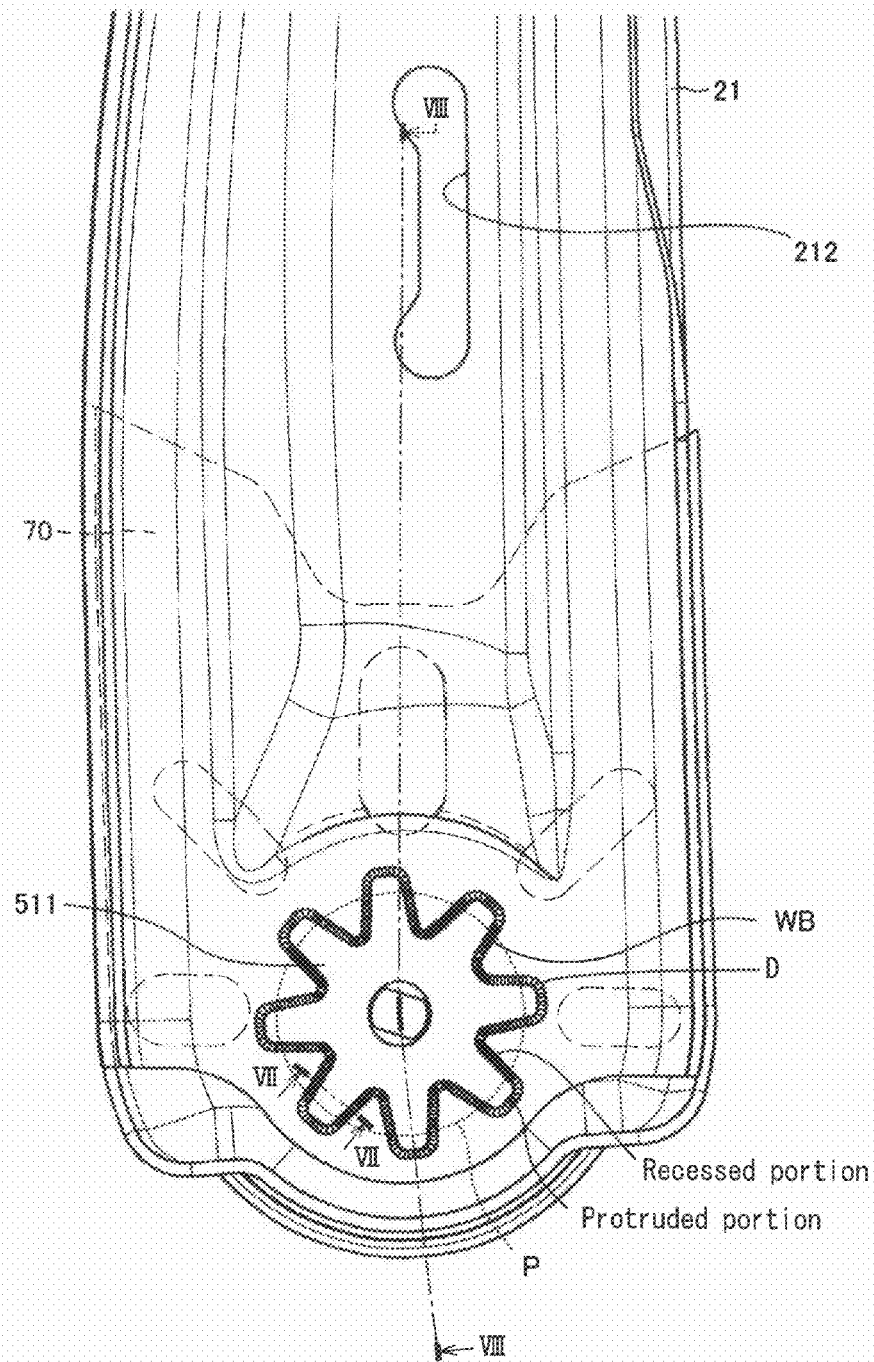
FIG. 6 is a drawing that illustrates a state of the right seatback side member, the reinforcement plate and the recliner being connected.
Figure 7:
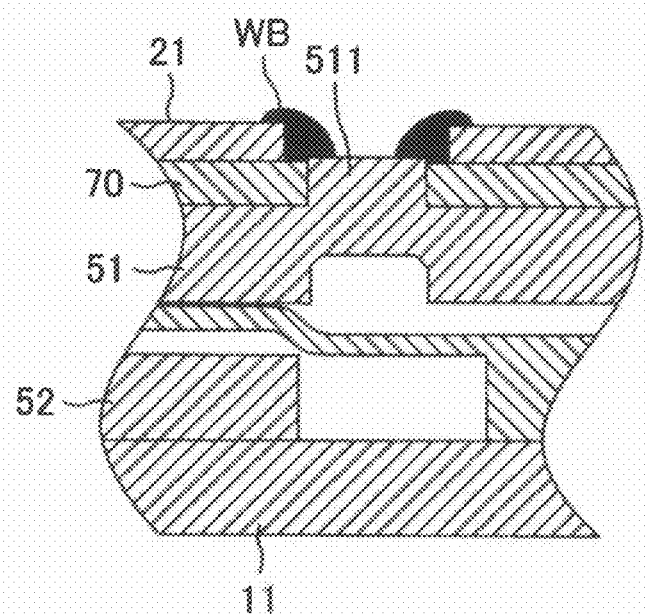
FIG. 7 is a cross-sectional view of the seat frame taken along a line VII-VII in FIG. 6.
Figure 8:
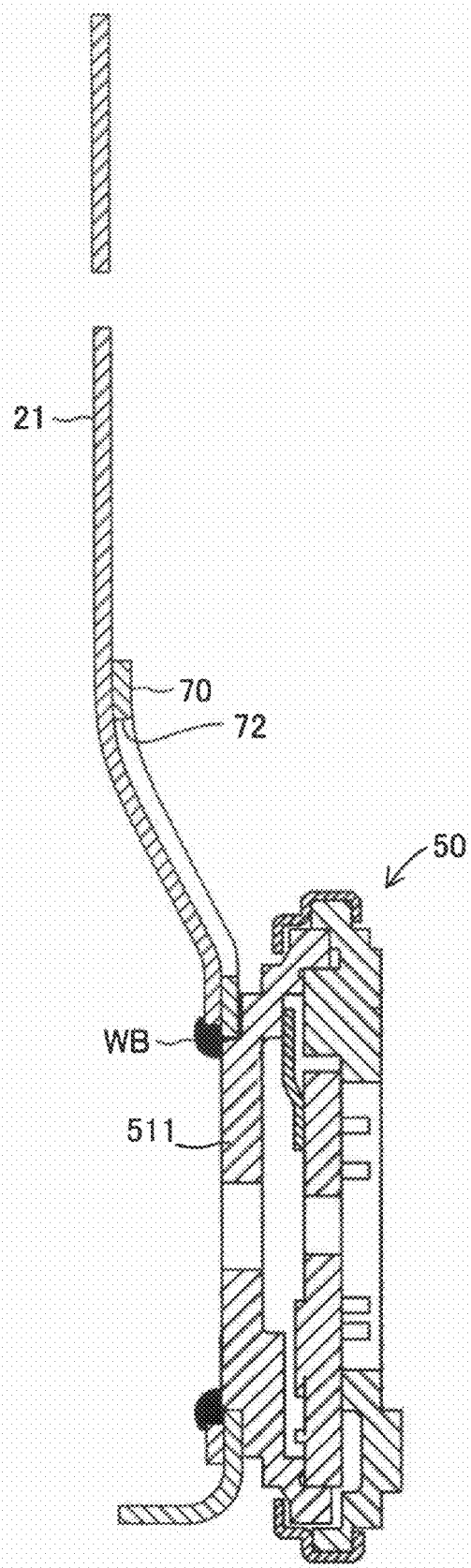
FIG. 8 is a partial cross-sectional view of the seat frame taken along a line VIII-VIII in FIG. 6.

FIG. 6 illustrates an enlarged configuration of a lower portion of the right seatback side member 21. FIG. 7 is a cross-sectional view of the seat frame taken along a line VII-VII in FIG. 6. FIG. 8 is a partial cross-sectional view of the seat frame taken along a line VIII-VIII in FIG. 6. As the drawings illustrate (especially the FIG. 6), the welding bead WB is formed on a whole periphery of the projecting portion 511 of the recliner 50. Welding the right seatback side member 21, the reinforcement plate 70, and the recliner 50 together in such a state connects the three members strongly together. A portion to be welded, formed by a whole periphery of the projecting portion 511, a whole periphery of the first through-hole 71, and the whole periphery of the second through-hole 211, is referred to as the three-member welding portion D. In other words, in the embodiment disclosed here, the recliner 50, the reinforcement plate 70, and the right seatback side member 21 are welded together at the three-member welding portion D. The cross sectional shape of the projecting portion 511 in the embodiment disclosed here is substantially star shaped, therefore, the three-member welding portion D is likewise substantially star shaped. The shape of the three-member welding portion D (likewise the cross sectional shape of the projecting portion 511, the shape of the first through-hole 71, and the shape of the second through-hole 211) is, as FIG. 6 illustrates, a circle P with the rotation axis of the first circular plate portion 51 of the recliner 50 as the center having recessed portions and protruded portions formed in the rotational direction of the recliner 50 (or the first circular plate portion 51).

The right seatback side member 21 and the reinforcement plate 70 are additionally welded at portions different from the three-member welding portion D, where the right seatback side member 21 and the reinforcement plate 70 are in contact with each other. A portion to be welded differently from the three-member welding portion D, formed by the right seatback side member 21 and the reinforcement plate 70, is referred to as a two-member welding portion C1 to C5. FIG. 9A to 9C illustrates the right seatback side member 21 and the reinforcement plate 70 connected at the two-member welding portions C1 to C5. FIG. 9A is FIG. 9B viewed from the arrow 9A. FIG. 9C is FIG. 9B viewed from the arrow 9C.

As FIG. 9 illustrates, in the embodiment disclosed here, each two-member welding portion C1 to C5 is formed at a portion where an outermost portion of the reinforcement plate 70 and the right seatback side member 21 contacts. To be more precise, one two-member welding portion C1 is formed at a portion where an upper central portion of the reinforcement plate 70 and the right seatback side member 21 contact, two two-member welding portions C2, C3 are formed at two portions where a side edge portion of the reinforcement plate 70 and the right seatback side member 21 contact, and two two-member welding portions C4, C5 are formed at two portions where the side edge portion of the reinforcement plate 70 on the other side and the right seatback side member 21 contact. The reinforcement plate 70 and the right seatback side member 21 are welded together at the aforementioned two-member welding portions C1 to C5. As FIG. 9B illustrates, the deformation area Ad is defined as an area (an area surrounded by an alternate long and short dash line in the drawing) between two-member welding portions C1 to C5 and three-member welding portion D (or a portion the first through-hole 71 is formed). Multiple deformation through-holes 72 are formed within the deformation area Ad.

In the seat frame 1 according to the embodiment disclosed here, when a vehicle is braked suddenly, the occupant on the seat is forced to a front direction and in turn the seat belt 80 is pulled by the weight of the occupant. The tensile force from the seat belt 80 is transmitted from the seat belt guide 27 to the right seatback side member 21, thus the right seatback side member 21 receives a pushing force to a down and front direction. The tensile force from the seat belt 80 is transmitted to the right seatback side member 21 and applies a force to the three-member welding portion D and the two-member welding portions C1 to C5. In the embodiment disclosed here, the right seatback side member 21 and the recliner 50 are connected by welding. As a result, a bonding between the two members is stronger compared to a connection therebetween by bolts. The rigidity of the seat frame 1 against the tensile force from the seat belt 80 is thus enhanced.

The shape of the three-member welding portion D is a shape having recessed portions and protruded portions formed in the rotational direction of the first circular plate portion 51 of the recliner 50. Because the recliner 50, the reinforcement plate 70, and the right seatback side member 21 are welded together along the three-member welding portion D having recessed portions and protruded portions formed in the rotational direction of the first circular plate portion 51 of the recliner 50, the welding strength against the pushing force applied to the right seatback side member 21 in a downward and front direction, in other words, against tensile force from the seat belt 80 working in the rotational direction of the recliner 50 (or the first circular plate portion 51), is improved. The rigidity of the seat frame 1 against the tensile force from the seat belt 80 working in the rotational direction of the first circular portion 51 of the recliner 50 is thus improved.

In the embodiment disclosed here, in addition to the recliner 50, the reinforcement plate 70, and the right seatback side member 21 being welded together at the three-member welding portion D, the right seatback side member 21 and the reinforcement plate 70 are welded together at the multiple two-member welding portions C1 to C5. By dispersing welded portions to several places, the tensile force applied to each welded portion may also be dispersed and weakened, thus the rigidity of the seat frame 1 against the tensile force from the seat belt 80 is further improved.

The deformation area Ad is arranged around the first through-hole 71 of the reinforcement plate 70, and the multiple deformation through-holes 72 are formed within the deformation area Ad. The deformation area Ad is arranged in the area between the two-member welding portions C1 to C5 and the three-member welding portion D. In this arrangement, the force applied to the two-member welding portions C1 to C5 is transmitted to the deformation area Ad prior to transferring the force to the three-member welding portion D. Strength of the deformation area Ad is lower compared to a portion other than the deformation area Ad. As a result, the deformation area Ad deforms by the force transmitted from the two-member welding portions C1 to C5. The deformation at the deformation area Ad equalizes the distribution of force applied to the three-member welding portion D, and suppresses an application of a biased force to the three-member welding portion D. Because the recliner 50 and the right seatback side member 21 are connected at the three-member welding portion D, dispersing the applied force to the three-member welding portion D uniformly prevents breaking of the recliner 50.

Each two-member welding portion C1 to C5 is formed at a portion where an outermost portion of the reinforcement plate 70 and the right seatback side member 21 comes in contact with each other. By welding the outermost portion of the reinforcement plate 70 to the right seatback side member 21, the right seatback side member 21 is further reinforced by the reinforcement plate 70.

The right seatback side member 21 includes the first side wall portion 213 facing a side of the seatback 40, the first front wall portion 214 extending from the front end of the first side wall portion 213 to the inward direction of the seatback 40, and the first rear wall portion 215 extending from the rear end of the first side wall portion 213 to the inward direction of the seatback 40. The reinforcement plate 70 includes the second side wall portion 73 facing the first side wall portion 213, the second front wall portion 74 facing the first front wall portion 214, and the second rear wall portion 75 facing the second rear wall portion 215. On the second side wall portion 73, the first through-hole 71 is formed. On the first side wall portion 213, the second through-hole 211 is formed. The right seatback side member 21 and the reinforcement plate 70 configured as such are produced by using a metal die and a presswork.

After using the metal die and the presswork, the right seatback side member 21 of the embodiment disclosed here is quenched inside the die by rapidly cooling therein. In other words, the right seatback side member 21 is manufactured by a die-quench method. A die-quench product is produced without separate quenching equipment. As a result, a highly rigid right seatback side member 21 may be manufactured at a reasonable price.

According to an aspect of the disclosure the seat frame 1 includes the seat cushion frame 10 including the right seat-cushion side member 11 extending along the front-rear direction of the seat cushion 30 of a vehicle seat and supporting the seat cushion 30, the seatback frame 20 with the retractor 26 installed to retain one end of the seat belt 80, including the right seatback side member 21 extending along the upward-downward direction of the seatback 40 of a vehicle and supporting the seatback 40, the recliner 50 arranged between the rearward portion 11a of the right seat-cushion side member 11 and the lower portion 21a of the right seatback side member 21, the recliner being adapted to rotate for adjusting an inclination angle of the seatback 40 relative to the seat cushion 30, a reinforcement plate 70 placed between the right seatback side member 21 and the recliner 50, the reinforcement plate being joined with the right seatback side member 21 in lap-joint fashion for reinforcing the strength of the right seatback side member 21 against the tensile force from the seat belt 80, the projecting portion 511 formed on the surface of the recliner 50 to face the reinforcement plate 70, the projecting portion 511 having the cross sectional shape with the recessed portions and the protruded portions in the rotational direction of the recliner 50. The reinforcement plate 70 includes the first through-hole 71 for fitting the projecting portion 511. The right seatback side member 21 includes the second through-hole 211 larger than the first through-hole 71 that extends within the second through-hole 211 when the right seatback side member 21 and the reinforcement plate 70 are overlaid. The three-member welding portion D is formed by a projecting portion periphery R of the projecting portion 511, a first through-hole periphery H of the first through-hole 71, and a second through-hole periphery S of the second through-hole 211 wherein the recliner 50, the reinforcement plate 70 and the right seatback side member 21 are welded together in a state which the projecting portion 511 of the recliner 50 fits into the first through-hole 71 of the reinforcement plate 70 while the reinforcement plate 70 and the right seatback side member 21 are overlaid.

The right seatback side member 21 is reinforced by the reinforcement plate 70 placed between the right seatback side member 21 and the recliner 50. The rigidity of the seat frame 1 against the tensile force from the seat belt 80 is thus improved. The recliner 50, the reinforcement plate 70, and the right seatback side member 21 are connected together by welding. As a result, the bonding between the aforementioned members is stronger compared to a connection therebetween by bolts. The shape of the three-member welding portion D, the portion where the recliner 50, the reinforcement 70, and right seatback side member 21 are connected by welding, is a shape along the periphery of the projecting portion 511 formed on the recliner 50. The cross sectional shape of the projecting portion 511 is a shape with recessed portions and protruded portions formed in the rotational direction of the recliner 50. As a result, the shape of the three-member welding portion D likewise is a shape with recessed portions and protruded portions formed in the rotational direction of the recliner 50. By welding the recliner 50, the reinforcement plate 70, and the right seatback side member 21 along the shape of the three-member welding portion D, the weld strength against the tensile force from the seat belt 80 applied to the right seatback side member 21 in a downward and front direction (or in the rotational direction of the recliner 50) is improved. The rigidity of the seat frame 1 against the tensile force from the seat belt 80 working in the rotational direction of the first circular portion 51 of the recliner 50 is thus enhanced.

According to the further aspect of the disclosure, the seat frame 1 further includes the two-member welding portions C1 to C5 different from the three-member welding portion D, formed at where the reinforcement plate 70 and the right seatback side member 21 contact with each other, wherein the reinforcement plate 70 and the right seatback side member 21 are welded together.

In addition to the recliner 50, the reinforcement plate 70, and the right seatback side member 21 being welded together at the three-member welding portion D, the reinforcement plate 70 and the right seatback side member 21 are also welded at the two-member welding portions C1 to C5. By dispersing welded portions to several places, the tensile force applied to each welded portion is dispersed and weakened, thus the rigidity of the seat frame 1 against the tensile force from the seat belt 80 is further improved.

According to another aspect of the disclosure, the seat frame 1 further includes the reinforcement plate 70 with the deformation area Ad arranged between the two-member welding portion C1 to C5 and the three-member welding portion D wherein the deformation area Ad is less rigid compared to a portion other than the deformation area Ad of the reinforcement plate 70.

The deformation area Ad formed on the reinforcement plate 70 is arranged in the area between the two-member welding portions C1 to C5 and the three-member welding portion D. In this arrangement, the force applied to the two-member welding portions C1 to C5 is transmitted to the deformation area Ad prior to transferring the force to the three-member welding portion D. Strength of the deformation area Ad is lower compared to a portion other than the deformation area Ad. As a result, the deformation area Ad easily deforms by the force transmitted from the two-member welding portions C1 to C5. The deformation at the deformation area Ad equalizes the distribution of force applied to the three-member welding portion D, and suppresses the application of the biased force to the three-member welding portion D. Because the recliner 50 and the right seatback side member 21 are connected at the three-member welding portion D, dispersing the applied force to the three-member welding portion D uniformly prevents a breaking of the recliner 50.

According to further aspect of the disclosure, the seat frame 1 further includes the deformation area Ad formed in the periphery area of the first through-hole 71.

The deformation area Ad is arranged around the first through-hole 71 of the reinforcement plate 70, which is the area between the two-member welding portions C1 to C5 and the three-member welding portion D. In this arrangement, the force applied to the two-member welding portions C1 to C5 is transmitted to the deformation area Ad prior to transferring the force to the three-member welding portion D. Strength of the deformation area Ad is lower compared to a portion other than the deformation area Ad. As a result, the deformation area Ad deforms by the force transmitted from the two-member welding portions C1 to C5. The deformation at the deformation area Ad equalizes the distribution of the force applied to the three-member welding portion D, and suppresses the application of the biased force to the three-member welding portion D. Because the recliner 50 and the right seatback side member 21 are connected at the three-member welding portion D, dispersing the applied force to the three-member welding portion D uniformly prevents the breaking of the recliner 50.

According to another aspect of this disclosure, the seat frame 1 further includes the two-member welding portion C1 to C5 wherein an outermost portion of the reinforcement plate 70 and the right seatback side member 21 are in contact with each other.

Each two-member welding portion C1 to C5 is formed at a portion where an outermost portion of the reinforcement plate 70 and the right seatback side member 21 comes in contact with each other. By welding the outermost portion of the reinforcement plate 70 to the right seatback side member 21, the right seatback side member 21 is further reinforced by the reinforcement plate 70.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat frame comprising:
a seat cushion frame including a front-rear direction frame extending along a front-rear direction of a seat cushion of a vehicle seat and supporting the seat cushion;
a seatback frame with a retractor installed to retain one end of a seat belt, including an upward-downward direction frame extending along an upward-downward direction of a seatback of a vehicle and supporting the seatback;
a recliner arranged between a rear end portion of the front-rear direction frame and a lower end portion of the upward-downward direction frame, the recliner being adapted to rotate for adjusting an inclination angle of the seatback relative to the seat cushion;
a reinforcement plate placed between the upward-downward direction frame and the recliner, the reinforcement plate being joined with the upward-downward direction frame in lap-joint fashion for reinforcing the strength of the upward-downward direction frame against the tensile force from the seat belt;
a projecting portion formed on a surface of the recliner to face the reinforcement plate, the projection portion having a cross sectional shape with a recessed portion and a protruded portion in a rotational direction of the recliner;
the reinforcement plate including a first through-hole for fitting the projecting portion;
the upward-downward direction frame including a second through-hole larger than the first through-hole which extends within the second through-hole when the upward-downward direction frame and the reinforcement plate are overlaid; and
a three-member welding portion formed by a projecting portion periphery of the projecting portion, a first through-hole periphery of the first through-hole, and a second through-hole periphery of the second through-hole wherein the recliner, the reinforcement plate and the upward-downward direction frame are welded together in a state which the projecting portion of the recliner fits into the first through-hole of the reinforcement plate while the reinforcement plate and the upward-downward direction frame are overlaid.

2. The seat frame according to claim 1 further comprising:
a two-member welding portion different from the three-member welding portion, formed at where the reinforcement plate and the upward-downward direction frame contact with each other, wherein the reinforcement plate and the upward-downward direction frame are welded together.

3. The seat frame according to claim 2 further comprising:
the reinforcement plate with a deformation portion arranged between the two-member welding portion and the three-member welding portion wherein the deformation portion is less rigid compared to a portion other than the deformation portion of the reinforcement plate.

4. The seat frame according to claim 3 further comprising:
the deformation portion formed in a periphery area of the first through-hole.

5. The seat frame according to claim 2 further comprising:
the two-member welding portion wherein an outermost portion of the reinforcement plate and the upward-downward direction frame are in contact with each other.

* * * * *